Nov. 24, 1925.
P. A. HERR
ELECTRIC POWER TRANSMITTER
Filed Sept. 18, 1924

Patented Nov. 24, 1925.

1,562,699

UNITED STATES PATENT OFFICE.

PARK A. HERR, OF HILLSIDE, NEW JERSEY, ASSIGNOR TO THE SINGER MANUFACTURING COMPANY, OF ELIZABETH, NEW JERSEY, A CORPORATION OF NEW JERSEY.

ELECTRIC POWER TRANSMITTER.

Application filed September 18, 1924. Serial No. 738,331.

*To all whom it may concern:*

Be it known that I, PARK A. HERR, a citizen of the United States, residing at Hillside, in the county of Union and State of New Jersey, have invented certain new and useful Improvements in Electric Power Transmitters, of which the following is a specification, reference being had therein to the accompanying drawings.

This invention relates to electric power-transmitters of the type adapted more particularly for driving sewing machines and has for an object to provide an improved transmitter unit of minimum length and maximum "pick-up" i. e., rate of acceleration in starting the driven machine.

A further object of the invention is to provide an electric transmitter the rotary clutch-elements of which are effectively guarded at all times.

The objects of the invention are attained by mounting the driving and driven clutch-elements within the motor-frame, and by so arranging the parts that the motor-shaft bearing heretofore customarily provided between the motor-elements and the driving clutch-element may be eliminated; the latter element being, in the present instance, carried by a rotary and endwise movable sleeve-shaft in which one end of the motor-shaft is journaled.

Figure 1:
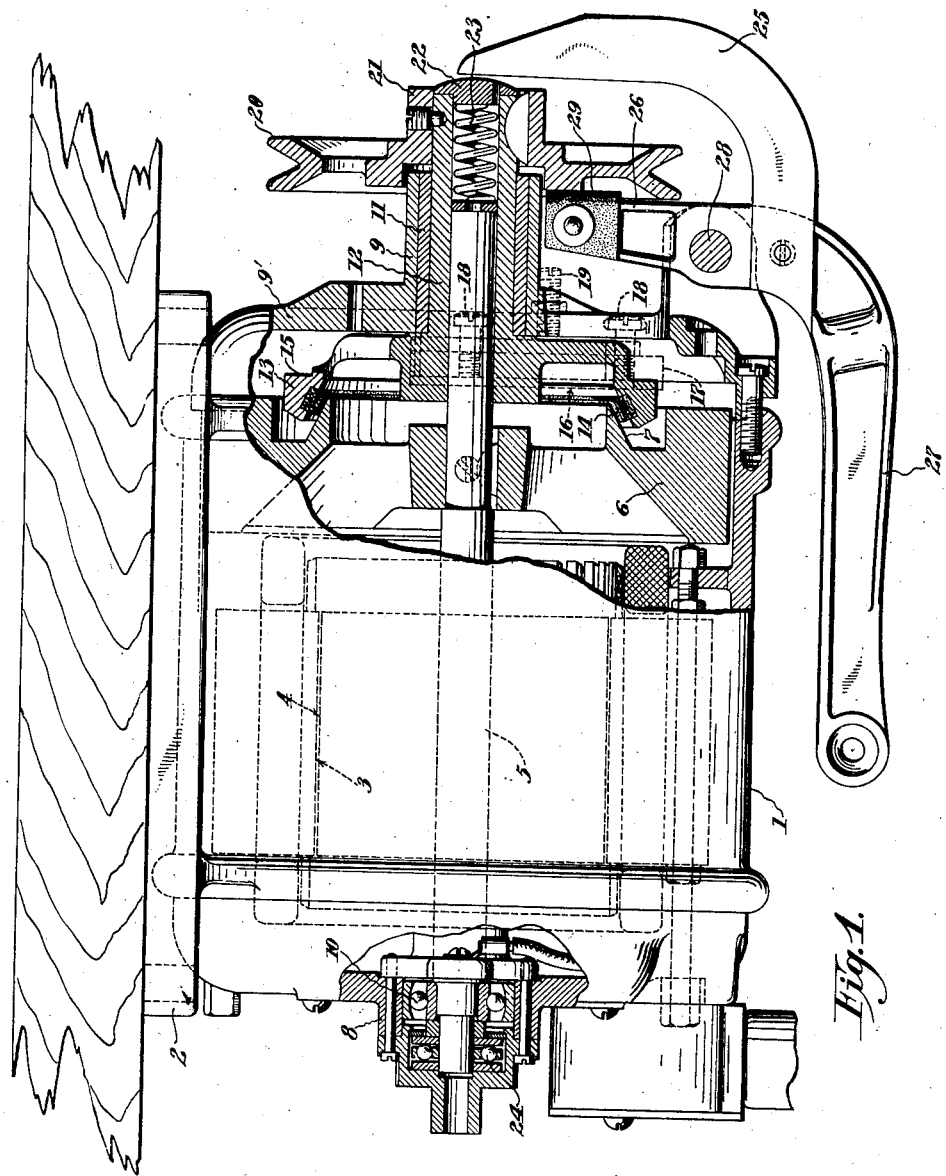
Figure 2:
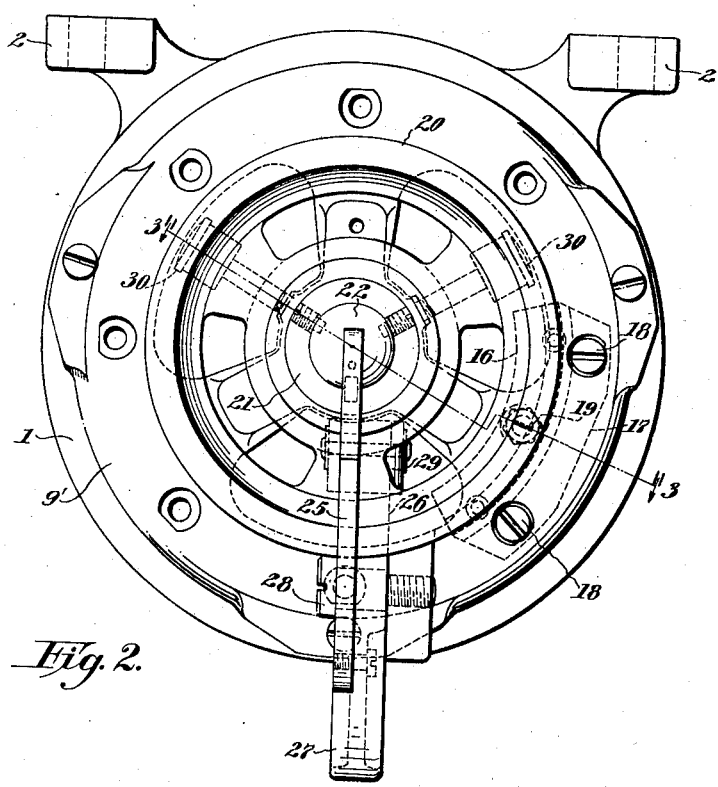
Figure 3:
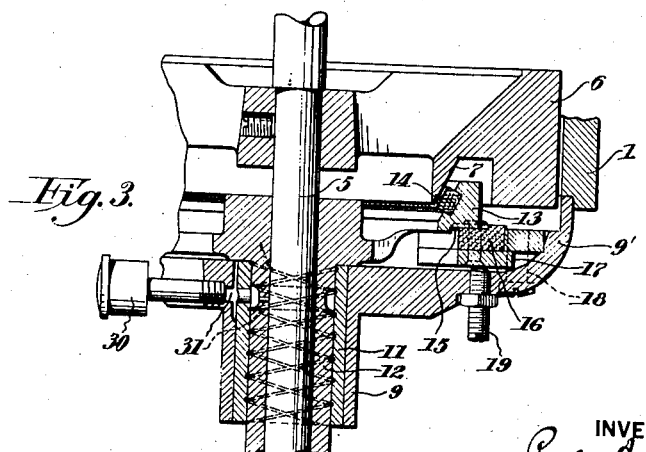

In the accompanying drawings, Fig. 1 is a side elevation, partly in section, of an electric transmitter unit embodying the invention. Fig. 2 is an end elevation of the same and Fig. 3 is a section on the line 3, 3 Fig. 2.

In the preferred embodiment of the invention, as illustrated, 1 represents the hollow cylindrical motor-frame including the usual attaching feet 2. Disposed within the motor-frame are the magnetically coacting stationary and rotary motor-elements, 3 and 4, respectively. These latter elements are shown as the usual stator and rotor elements of a squirrel-cage induction motor, but the particular type of motor elements is immaterial to the present improvement. The rotary motor-element 3 is fixed to the motor-shaft 5 to which is also fixed within the motor-frame the weighted fly-wheel 6 having the conical clutch face 7.

The motor-frame has at its opposite ends the bearing supports, 8, 9 in the former of which is placed a bearing 10 for one end of the motor-shaft 5. The bearing support 9 which is carried by the removable end-bonnet element 9′ of the motor-frame, is fitted with the bearing bushing 11 in which is journaled the rotary and endwise movable sleeve-shaft 12, the inner end of which carries and is preferably formed integral with the driven clutch-member 13 provided with a friction ring 14, say of leather, mating with the face 7 of the driving clutch-element. The driven clutch-element 13 is also preferably formed with a braking surface 15 adapted to engage the stationary brake-shoe 16 which is carried by the plate 17 secured internally to the end-bonnet element 9′ of the motor-frame 1 by screws 18.

An adjusting screw 19 is arranged to bear upon the plate 17 and move the brake-shoe 16 toward the driven clutch-element 15 to compensate for wear on the brake-shoe; the screws 18 being loosened sufficiently to permit the desired adjustment to be made.

Fixed to the outer end of the sleeve-shaft 12 externally of the motor-frame is the belt-pulley 20 within the end of the hub 21 of which is tightly fitted the button 22 having a shank entering the sleeve-shaft 12.

A coil-spring 23 is interposed between the button 22 and the motor-shaft 5 and urges the driven clutch-member 13 toward brake shoe 16, at the same time urging the motor-shaft 5 in the opposite direction and against the thrust-bearing 24 provided at the opposite end of the motor-shaft adjacent the bearing support 8.

Manual control of the clutch mechanism is afforded by a lever formed with three arms 25, 26, 27 and fulcrumed at 28 on the removable end-bonnet element 9′ of the motor-frame 1. The arm 25 is arranged to bear upon the button 22 and force the sleeve-shaft and driven clutch-element 13 into working engagement with the driving clutch-element 6. The arm 26 has riveted thereto a leather shoe 29 arranged to assist the spring 23 in shifting the driven elements 13, 12, 20 in the opposite direction. The arm 27 is connected to a treadle by the usual stiff rod (not shown), whereby both downward and upward impulses may be imparted to said arm.

Lubrication of the bearings between the motor-shaft 5, sleeve-shaft 12 and bushing 11 may be effected by providing suitable grease cups 30 and lubricant channels 31.

By virtue of placing the rotary motor-element 3, fly-wheel 6 and driven clutch-element 13 in close juxtaposition within the motor-frame and between the bearings for the motor-shaft, great compactness is secured while retaining maximum acceleration afforded by a heavy fly-wheel. There are but two bearings for the motor-shaft and these bearings are at the opposite ends of the motor-frame. Access to the clutch-elements is readily had by removal of the end-bonnet 9' and without the necessity of disassembling the driven elements 13, 20 and clutch-controlling lever 25, 26, 27. The clutch-elements, being disposed within the cylindrical motor-frame, are effectively guarded at all times.

Having thus set forth the nature of the invention, what I claim herein is—

1. An electric power-transmitter comprising a frame having bearings at its opposite ends only, a rotary and endwise movable sleeve-shaft journaled in one of said bearings, a driven clutch-element carried by said sleeve-shaft at its inner end between said bearings and formed with a friction clutch-face, a belt-pulley fixed to the outer end of said sleeve-shaft, a motor-shaft journaled at its opposite ends only in said sleeve-shaft and the other of the motor-frame bearings, a driving clutch-element fixed to the motor-shaft between the bearings for such shaft and formed with a friction clutch-face mating with that of the driven clutch-element, magnetically coacting stationary and rotary motor elements, said rotary element being fixed to the motor-shaft adjacent said fly-wheel, manually operated means for sliding said sleeve-shaft endwise, and a thrust bearing associated with the motor-shaft bearing remote from said sleeve-shaft.

2. An electric power-transmitter comprising a hollow cylindrical frame having bearings at its opposite ends only, a rotary and endwise movable sleeve-shaft journaled in one of said bearings, a driven clutch-element carried by said sleeve-shaft within the motor-frame and formed with a friction clutch face, a belt-pulley fixed to said sleeve-shaft externally of the motor-frame, a motor-shaft journaled at its opposite ends only in said sleeve-shaft and the other of the motor-frame bearings, a fly-wheel fixed to the motor-shaft within the motor-frame and formed with a clutch-face mating with that of the driven clutch-element, magnetically coacting stationary and rotary motor-elements within said motor-frame, said rotary element being fixed to the motor-shaft adjacent said fly-wheel, manually operated means for sliding said sleeve-shaft endwise, and a thrust bearing associated with the motor-shaft bearing at the end of the motor-frame opposite the end carrying the sleeve-shaft.

3. An electric power-transmitter comprising a hollow cylindrical frame having bearings at its opposite ends only, a rotary and endwise movable sleeve-shaft journaled in one of said bearings, a driven clutch-element carried by said sleeve-shaft within the motor-frame and formed with a friction clutch-face, a belt-pulley fixed to said sleeve-shaft externally of the motor-frame, a motor-shaft journaled at its opposite ends only in said sleeve-shaft and the other of the motor-frame bearings, a driving clutch-element fixed to the motor-shaft within the motor-frame and formed with a clutch-face mating with that of the driven clutch-element, magnetically coacting stationary and rotary motor-elements within said motor-frame, said rotary element being fixed to the motor-shaft adjacent said fly-wheel, manually operated means for sliding said sleeve-shaft endwise, a thrust bearing associated with the motor-shaft bearing at the end of the motor-frame opposite the end carrying the sleeve-shaft, and a spring operatively interposed between said sleeve and motor-shafts.

4. An electric power-transmitter comprising a hollow cylindrical frame having bearings at its opposite ends only, a rotary and endwise movable sleeve-shaft journaled in one of said bearings, a driven clutch-element carried by said sleeve-shaft within the motor-frame and formed with a friction clutch-face, a belt-pulley fixed to said sleeve-shaft externally of the motor-frame, a motor-shaft journaled at its opposite ends only in said sleeve-shaft and the other of the motor-frame bearings, a driving clutch-element fixed to the motor-shaft within the motor-frame and formed with a clutch-face mating with that of the driven clutch-element, magnetically coacting stationary and rotary motor-elements within said motor-frame, said rotary element being fixed to the motor-shaft adjacent said fly-wheel, manually operated means for sliding said sleeve-shaft endwise, a thrust bearing associated with the motor-shaft bearing at the end of the motor-frame opposite the end carrying the sleeve-shaft, and a stationary brake shoe mounted within the motor-frame for engagement by the driven clutch-element when the latter is moved away from the driving clutch-element.

In testimony whereof, I have signed my name to this specification.

PARK A. HERR.